(12) United States Patent
Villavicencio et al.

(10) Patent No.: US 10,623,402 B2
(45) Date of Patent: Apr. 14, 2020

(54) ENHANCED SECURITY AUTHENTICATION SYSTEM

(71) Applicant: ADP, LLC, Roseland, NJ (US)

(72) Inventors: Frank Villavicencio, Tenafly, NJ (US); Zhitao Xu, Guttenberg, NJ (US); Vincent Civetta, Randolph, NJ (US); Deepak Kaushal, Mendham, NJ (US); Nishant Kaushik, Jersey City, NJ (US)

(73) Assignee: ADP, LLC, Roseland, NJ (US)

( * ) Notice: Subject to any disclaimer, the term of this patent is extended or adjusted under 35 U.S.C. 154(b) by 264 days.

(21) Appl. No.: 15/492,968

(22) Filed: Apr. 20, 2017

(65) Prior Publication Data

US 2018/0309752 A1 Oct. 25, 2018

(51) Int. Cl.
*H04L 29/06* (2006.01)
*H04W 12/06* (2009.01)
*H04W 12/00* (2009.01)

(52) U.S. Cl.
CPC ........ *H04L 63/0853* (2013.01); *H04L 63/083* (2013.01); *H04L 63/0861* (2013.01); *H04L 63/0876* (2013.01); *H04L 63/1433* (2013.01); *H04W 12/00502* (2019.01); *H04W 12/00503* (2019.01); *H04W 12/00505* (2019.01); *H04W 12/00508* (2019.01); *H04W 12/06* (2013.01)

(58) Field of Classification Search
None
See application file for complete search history.

(56) References Cited

U.S. PATENT DOCUMENTS

| 8,646,060 | B1 | 2/2014 | Ayed | |
|---|---|---|---|---|
| 2007/0143832 | A1 | 6/2007 | Perrella et al. | |
| 2008/0086759 | A1* | 4/2008 | Colson | G06F 21/34 726/2 |
| 2011/0225625 | A1 | 9/2011 | Wolfson et al. | |
| 2012/0060207 | A1 | 3/2012 | Mardikar et al. | |
| 2014/0130127 | A1* | 5/2014 | Toole | G06F 21/60 726/3 |

(Continued)

OTHER PUBLICATIONS

"Advantages of a Risk Based Authentication Strategy for Mastercard Securecode," Mastercard, copyright 2011, 12 pages, accessed Apr. 18, 2017. https://globalrisk.mastercard.com/wp-content/uploads/2015/12/Advantages-of-Risk-Based-Authentication.pdf.

*Primary Examiner* — Andrew J Steinle
(74) *Attorney, Agent, or Firm* — Yee & Associates, P.C.

(57) ABSTRACT

A method, a computer system, and a computer program product for authenticating a transaction are provided. An authentication system receives the transaction over a particular channel of a plurality of support channels. A risk score is determined for the transaction based on a number of contextual risk factors. An authentication scheme is determined from a number of authentication schemes for authenticating an identity of the user within an authentication context. The authentication scheme is determined based on the particular channel and the risk score. In response to successfully authenticating the identity of the user within the authentication context, the authentication system determines whether the transaction is a permitted transaction based on an assurance level associated with the authentication context. In response to determining that the transaction is the permitted transaction, the transaction is authenticated.

36 Claims, 5 Drawing Sheets

(56) References Cited

U.S. PATENT DOCUMENTS

| | | | |
|---|---|---|---|
| 2014/0289790 A1* | 9/2014 | Wilson | G06Q 20/42 |
| | | | 726/1 |
| 2015/0319185 A1* | 11/2015 | Kirti | H04L 63/1416 |
| | | | 726/23 |
| 2016/0080355 A1* | 3/2016 | Greenspan | G06F 21/51 |
| | | | 726/7 |

* cited by examiner

ENHANCED SECURITY AUTHENTICATION SYSTEM

BACKGROUND INFORMATION

1. Field

The present disclosure relates generally to an improved authentication system for a device and, in particular, to a method and system for authenticating a transaction from a user at a first device using credentials from a second device.

2. Background

Mobile devices, such as tablet PCs and smartphones, are increasing in popularity and are quickly replacing desktop Personal Computers (PCs) in both consumer and business sectors. Mobile devices connected to the Internet allow users to access even the most sensitive information, such as payroll or other financial information and accounts, from anywhere that a connection to the Internet is available.

A single user often has an account with different service providers, such as employers, financial institutions, or other entities, each with a unique username and password associated with the account. These existing authentication security systems are often conceived and implemented in a silo manner, with specialization in a particular area or channel. For example, a single organization may have multiple authentication schemes, such as a web-based authentication scheme, an application programming interface security authentication scheme, a mobile authentication scheme, a biometric authentication scheme, and a risk-based authentication scheme.

Thus, existing authentication systems often lead organizations to implement redundant authentication systems, adding complexity and introducing inconsistencies in how security is to be enforced across different access channels. For example, security systems applied to different channels may implement inconsistent security policies. Therefore, a transaction that is permitted over one channel enforcing a first security policy may be prohibited when submitted over a different channel having a different security policy.

It would be desirable to have a method and apparatus that take into account at least some of the issues discussed above, as well as other possible issues. For example, it would be desirable to have a method and apparatus that overcome a technical problem with authenticating a transaction from the user to provide consistent authentication across multiple interaction channels.

SUMMARY

An embodiment of the present disclosure provides a method for authenticating a transaction of a user. An authentication system receives a transaction over a particular channel. The particular channel is one of a plurality of support channels. The authentication system determines a risk score for the transaction based on a number of contextual risk factors. The authentication system determines an authentication scheme from a number of authentication schemes for authenticating an identity of the user within an authentication context. The authentication scheme is determined based on the particular channel and the risk score. The authentication system uses the authentication scheme to authenticate the identity of the user within the authentication context. In response to successfully authenticating the identity of the user within the authentication context, the authentication system determines whether the transaction is a permitted transaction based on an assurance level associated with the authentication context. In response to determining that the transaction is a permitted transaction, the authentication system authenticates the transaction.

Another embodiment of the present disclosure provides a computer system comprising a hardware processor and an authentication system in communication with the processor. The authentication system is configured to receive a transaction over a particular channel. The particular channel is one of a plurality of supported channels. The authentication system is further configured to determine a risk score for the transaction based on a number of contextual risk factors. The authentication system is further configured to determine an authentication scheme from a number of authentication schemes for authenticating an identity of the user within an authentication context. The authentication scheme is determined based on the particular channel and the risk score. The authentication system is further configured to use the authentication scheme to authenticate the identity of the user within the authentication context. The authentication system is further configured to determine whether the transaction is a permitted transaction in response to successfully authenticating the identity of the user within the authentication context. The permitted transaction is determined based on an assurance level associated with the authentication context. The authentication service authenticates the transaction in response to determining that the transaction is the permitted transaction.

Yet another embodiment of the present disclosure provides a computer program product for authenticating a transaction of a user. The computer program product comprises a computer readable storage media having program code stored thereon. The program code includes code for receiving the transaction over a particular channel. The particular channel is one of a plurality of supported channels. The program code further includes code for determining a risk score for the transaction based on a number of contextual risk factors. The program code further includes the code for determining an authentication scheme from a number of authentication schemes for authenticating an identity of the user within an authentication context. The authentication scheme is determined based on the particular channel and the risk score. The program code further includes the code for using the authentication scheme to authenticate the identity of the user within the authentication context. The program code further includes the code for determining whether the transaction is a permitted transaction based on an assurance level associated with the authentication context. The determination is made in response to successfully authenticating the identity of the user within the authentication context. The program code further includes the code for authenticating the transaction in response to determining that the transaction is a permitted transaction.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current methodologies for identifying a user are not as efficient as desired. The illustrative embodiments also recognize and take into account that a user can have multiple user identities and user accounts for various service providers. The illustrative embodiments recognize and take into account that there may be different ways, or different authentication schemes for verifying the user's credentials. For example, the user may login to a server directly, using a username and a password. Alternatively, the user may login to the server using a federated authentication scheme. The illustrative embodiments recognize and take into account that existing solutions may inconsistently verify the identity of the user based on different risk policies that are applied to different access channels.

The illustrative embodiments provide a method, computer system, and a computer program product for authenticating a transaction of a user. In one illustrative example, an authentication system receives a transaction over a particular channel. The particular channel is one of a plurality of support channels. The authentication system determines a risk score for the transaction based on number of contextual risk factors. The authentication system determines an authentication scheme from a number of authentication schemes for authenticating an identity of the user within an authentication context. The authentication scheme is determined based on the particular channel and the risk score. The authentication system uses the authentication scheme to authenticate the identity of the user within the authentication context. In response to successfully authenticating the identity of the user within the authentication context, the authentication system determines whether the transaction is a permitted transaction based on an assurance level associated with the authentication context. In response to determining that the transaction is a permitted transaction, the authentication system authenticates the transaction.

Figure 1:
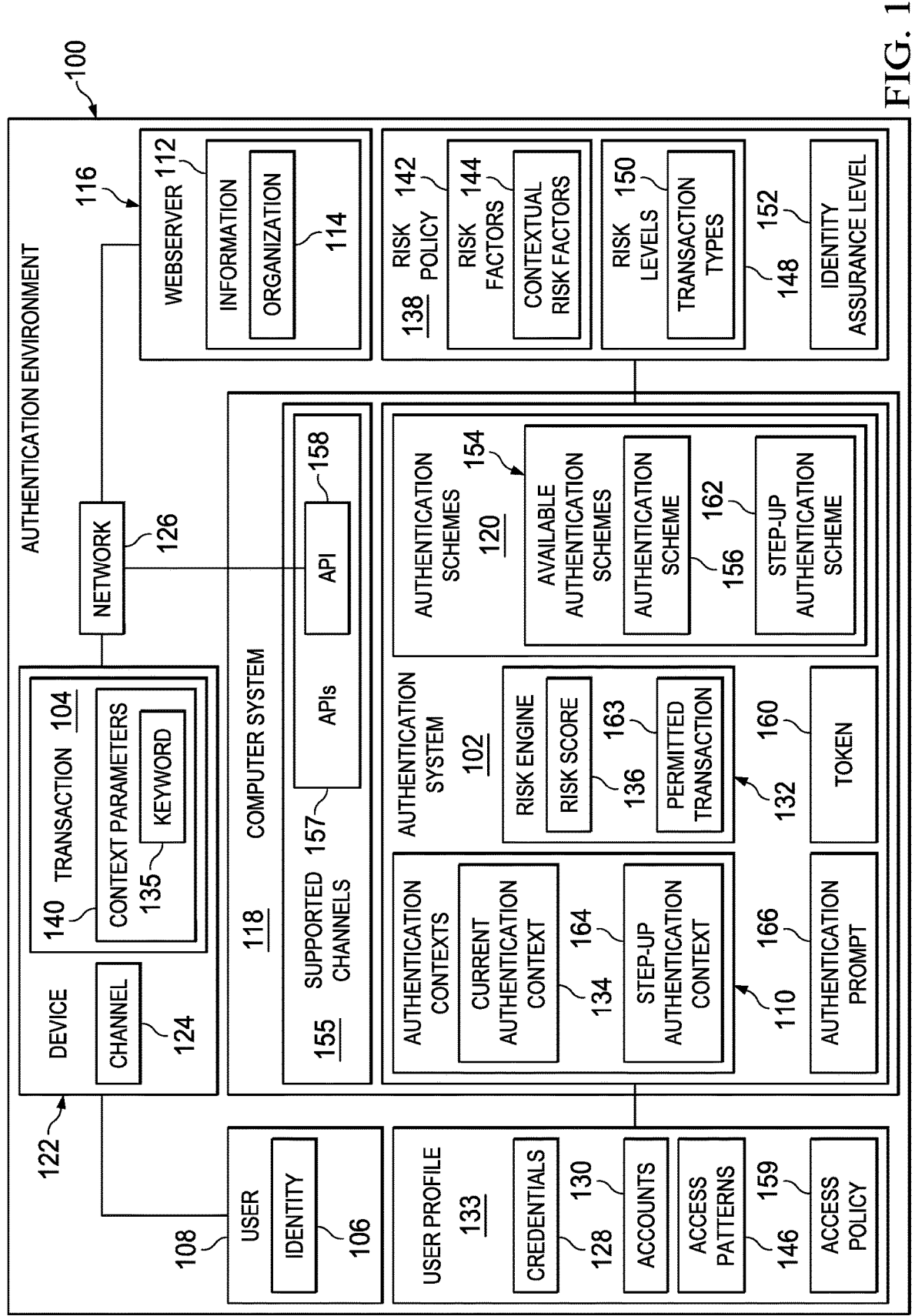
FIG. 1 is an illustration of a block diagram of an authentication environment for authenticating a transaction of a user depicted in accordance with an illustrative embodiment.

With reference now to the figures and, in particular, with reference to FIG. 1, an illustration of a block diagram of an authentication environment for authenticating a transaction of a user is depicted in accordance with an illustrative embodiment. In this illustrative example, authentication environment 100 includes authentication system 102. Authentication system 102 authenticates transaction 104 by verifying identity 106 of user 108 within one of authentication contexts 110. In one illustrative example, when transaction 104 is authenticated, authentication system 102 permits access to information 112. The access may include at least one of reading, writing, modifying, or operating on information 112. Information 112 may be information about organization 114.

Organization 114 may be, for example, a corporation, a partnership, a charitable organization, a city, a government agency, or some other suitable type of organization. Information 112 about organization 114 may include, for example, at least one of information about people, products, research, product analysis, business plans, financials, or other information relating to organization 114. Information 112, as used herein, may comprise any information that is related to user 108 in the context of organization 114. Information 112 may include sensitive information such that user 108 may discourage dissemination or disclosure of information 112 to a third party. For example, information 112 may be personal financial information for user 108. For example, information 112 may include at least one of payroll information, tax information, salary information, a social security number, or other types of personal information. Information 112 may be located on webserver 116.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Authentication system 102 comprises physical hardware and may include at least one of server computers, web servers, proxy servers, file transfer protocol servers, workstations, personal computers, laptop computers, tablets, mobile phones, or any other type of data processing system that can verify the identity of user 108. Authentication system 102 may also be referred to herein as an "identity provider," or a "service provider."

Authentication system 102 may be implemented in software, hardware, firmware, or a combination thereof. When software is used, the operations performed by authentication system 102 may be implemented in program code configured to run on hardware, such as a processor unit. When firmware is used, the operations performed by authentication system 102 may be implemented in program code and data and stored in persistent memory to run on a processor unit. When hardware is employed, the hardware may include circuits that operate to perform the operations in authentication system 102.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Authentication system 102 may be implemented in computer system 118. Computer system 118 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

Authentication system 102 may use a number of different ones of authentication schemes 120 to verify identity 106 of user 108 within one of authentication contexts 110. "A number of," as used herein with reference to an item, means one or more items. For example, authentication schemes 120 may include a direct authentication scheme that uses a password. Authentication schemes 120 may further include a federated authentication scheme in which an identity provider verifies identity 106 of user 108 on behalf of authentication system 102. In various embodiments, authentication schemes 120 may also include other authentication schemes such as a token, a certificate, or a single sign-on based scheme.

User 108 uses device 122 to communicate with authentication system 102 in order to authenticate transaction 104. Device 122 is a computer system comprising physical hardware. For example, device 122 includes at least one of a desktop computer, a laptop computer, a tablet, a mobile phone, such as a cellular or smart phone, or any other suitable type of data processing system that can access information 112 over a network, such as network 126.

Network 126 is a communications medium and may include one or more wireless or wired data networks. Network 126 may include one or more of a wireless cellular data network, a local area network, a wide area network, the Internet, an intranet, or other suitable types of networks.

Device 122 uses channel 124 to connect to authentication system 102 via network 126. In one illustrative example, channel 124 may be a wireless cellular data network channel, such as a code division multiple access (CDMA) or a global system for mobiles (GSM), to access the Internet. Alternatively, channel 124 may be a wired link to network 126. Authentication system 102 may access the Internet via a wired link. In this manner, device 122 is in communication with authentication system 102 via network 126.

Authentication contexts 110 are the different circumstances and environments under which identity authentication system 102 verifies identity 106 of user 108. Each of authentication contexts 110 may be associated with different ones of credentials 128 and accounts 130, as indicated in user profile 133. For example, authentication contexts 110 may include at least one of an identity management context, an organizational context, and a social context.

Authentication contexts 110 can be associated with corresponding ones of accounts 130, such that different ones of accounts 130 can provide different ones of authentication contexts 110 for transaction 104. Similarly, each of accounts 130 may require different ones of credentials 128. Credentials 128 are at least one of attestations, assurances, veracities, or validations of identity 106 of user 108 that are required by authentication system 102 to validate identity 106 of user 108 in one or more authentication contexts 110.

In one illustrative example, transaction 104 is a lookup transaction for identifying one or more of accounts 130. Continuing with this illustrative example, transaction 104 can include at least one of keyword 135 that is sent to authentication system 102 to uniquely identify one or more of accounts 130 in user profile 133. Keyword 135 includes one or more of a name, a username, an email address, a name of an employer, a client identifier, a company registration code, or some other type of element that can be used to identify user 108. Keyword 135 may be a portion of the element. For example, keyword 135 may be a string of characters comprising a domain of an email address. As another example, keyword 135 may be a portion of the name of the employer. In other words, keyword 135 may be an incomplete portion of an element used to uniquely identify one or more of accounts 130 in user profile 133.

Continuing with the current illustrative example, Authentication system 102 identifies user profile 133 associated with user 108 upon receiving transaction 104. User profile 133 may include attributes that correspond to keyword 135 or portions of keyword 135. Authentication system 102 compares keyword 135 received from user 108 with attributes of user profile 133 to identify user profile 133, including one or more of accounts 130. For example, user 108 may not be aware of each of accounts 130 associated with user profile 133. In this example, user 108 knows a first name, a last name, and an employer name, which user 108 provides as keyword 135 in transaction 104. Authentication system 102 then compares keyword 135 with attributes of user profile 133 to determine accounts 130 associated with user 108.

As depicted, authentication system 102 includes risk engine 132. In one illustrative example, risk engine 132 is an adaptive authentication and fraud detection platform for authenticating transaction 104 within current authentication context 134. Risk engine 132 uses a risk-based, multifactor authentication. Using a risk and rules based approach, risk engine 132 may prohibit or require additional identity assurances if transaction 104 is determined to have a high risk score 136, violates risk policy 138, and combinations thereof.

In one illustrative example, risk engine 132 uses a self-learning statistical evaluation to generate risk score 136 for transaction 104. Risk score 136 can be a numeric score within a predefined range, where higher scores indicate a greater level of risk. In an illustrative embodiment, risk engine 132 determines risk score 136 by applying risk policy 138 to context parameters 140 of transaction 104.

In this illustrative example, risk policy 138 is a group of rules. Risk policy 138 also may include data used to apply the group of rules. As used herein, the phrase a "group of," when used with reference to items, means one or more items. For example, a "group of rules" is one or more rules.

For example, risk policy 138 may include one or more rules related to risk factors 142. Risk factors 142 are circumstances that indicate a potential risk associated with transaction 104. Risk factors 142 may include circumstances such as time of day, geographic location, quality of network 126, or other factors. For example, the geographic location of device 122 may be ascertained using network 126 or information in transaction 104. Certain geographic locations may have an elevated risk, such as, for example, an international location. As another example, the quality of network 126 may influence risk score 136. In this example, the quality of network 126 is based on signal strength (e.g., latency or wireless signal strength) or a presence or lack of an encrypted wireless connection.

As depicted, contextual risk factors 144 are risk factors 142 that are applicable to context parameters 140 of transaction 104 and current authentication context 134. For example, contextual risk factors 144 can include a transaction type of transaction 104, current authentication context 134, a time of day that transaction 104 is received, a geographic location from which transaction 104 is received, a type of device 122, comparisons to prior ones of access patterns 146 indicated in user profile 133, keyword 135, a quality of network 126, device profiling, behavioral profiling, and data within a repository of known fraud patterns.

In another example, risk policy 138 may include one or more rules related to risk levels 148. Risk levels 148 indicate a risk associated with transaction types 150. Risk levels 148 can be a numeric score within a predefined range, where higher scores indicate a greater level of risk. Transaction types 150 are classifications for transaction 104. For example, transaction types 150 can include lookup transactions, transactions for authenticating identity 106 of user 108, transactions related to accounts 130, and transactions to manage privileges of accounts 130.

In another example, risk policy 138 may include one or more rules related to identity assurance levels 152. Identity assurance levels 152 are classifications of a certainty of identity 106 based upon current authentication context 134. Different ones of authentication contexts 110 may provide different ones of identity assurance levels 152. For example, an identity management authentication context may be associated with an identity assurance level indicating a greater degree of certainty than an identity assurance level associated with a social authentication context.

Risk engine 132 generates risk score 136 for transaction 104 based on the application of one or more rules of risk policy 138 to context parameters 140 of transaction 104. As a result, more certainty is present in authenticating transaction 104 based on a determination of risk score 136 within current authentication context 134 when using authentication system 102. In other words, authentication system 102 uses a risk-based, multifactor authentication based on the application of one or more rules in risk policy 138 to context parameters 140 of transaction 104 to determine risk score 136 for transaction 104. In this manner, transaction 104 is enabled based on risk factors 142, risk levels 148, and identity assurance levels 152.

Based on channel 124 and risk score 136, authentication system 102 determines at least one of available authentication schemes 154 for authenticating identity 106 of user 108 within current authentication context 134. Available authentication schemes 154 are ones of authentication schemes 120 that can be used to authenticate transaction 104 submitted over channel 124.

As depicted, computer system 118 allows access to authentication system 102 over supported channels 155. Supported channels 155 are communication channels that can be used to connect to authentication system 102 via network 126. Supported channels 155 can include, for example, a web-based authentication channel, a mobile authentication channel, a biometric authentication channel, a voice channel, and a risk-based authentication channel. Each one of supported channels 155 corresponds to at least a group of application programming interfaces (APIs) 157 that allow access to authentication system 102. In this illustrative example, API 158 allows access to authentication system 102 over channel 124 used by device 122.

The illustrative embodiments recognize and take into account that not all of authentication contexts 110 may be compatible with API 158 used by channel 124. Therefore, available authentication schemes 154 include ones of authentication schemes 120 that can be used to authenticate transaction 104 submitted over channel 124.

User profile 133 includes access policy 159. Access policy 159 governs or ranks authentication schemes 120 to determine which one of available authentication schemes 154 is selected for authentication scheme 156. Access policy 159 may be based on one or more factors such as access preferences of user 108, access preferences of organization 114, and risk score 136. User preferences may be a record of an authentication scheme that user 108 has indicated as being preferred. For example, a user preference may be a selection to remember a particular one of authentication schemes 120. As another example, a user preference may be one of authentication schemes 120 that was previously selected. Organizational preferences may indicate a preference set by organization 114. For example, organization 114 may prefer that authentication scheme 156 be a federated authentication scheme and, more specifically, that a particular identity provider may be preferred.

Access policy 159 may select authentication scheme 156 from available authentication schemes 154. For example, access policy 159 may select authentication scheme 156 by weighing the factors for available authentication schemes 154 and selecting authentication scheme 156 having the greatest weight.

After authenticating identity 106 of user 108 within current authentication context 134, authentication system 102 generates token 160. Token 160 may be any security token or cookie that attests identity 106 of user 108 within current authentication context 134. For example, token 160 may be a certificate, a session identifier, a web token, an OAuth token, an OpenID Connect, SAML, or some other suitable type of token or cookie. Authentication system 102 uses token 160 to enable transaction 104.

Token 160 may include an identifier that uniquely identifies at least one of user 108 or device 122. Token 160 may also include a time stamp indicating when token 160 expires, when token 160 was generated, or a combination of both. Token 160 may be a time-sensitive token such that token 160 expires after a predetermined amount of time has elapsed. The predetermined amount of time may be based on risk score 136, or a level of sensitivity of information 112. For example, the predetermined amount of time may provide a shorter amount of time for information 112 that has a greater level of sensitivity than for information 112 that is less sensitive.

Authentication system 102 sends token 160 to device 122, or otherwise enables device 122 to access and retrieve token 160 from authentication system 102. Token 160 is then stored on device 122. In various embodiments, a copy of token 160 may also reside on authentication system 102. Device 122 can include token 160 as part of context parameters 140 for subsequently submitted transactions.

After successfully authenticating identity 106 of user 108 within current authentication context 134, authentication system 102 determines whether transaction 104 is permitted transaction 163 within current authentication context 134. Permitted transaction 163 corresponds to one of transaction types 150 that is allowed based on the identity assurance levels 152 of current authentication context 134. Because different ones of authentication contexts 110 may provide different ones of identity assurance levels 152, transaction 104 may be permitted transaction 163 under certain ones of authentication contexts 110, while not being permitted under other authentication contexts 110. For example, transaction 104 may be permitted transaction 163 when current authentication context 134 is an identity management authentication context. However, the same one of transaction 104 may not be permitted transaction 163 when current authentication context 134 is a social authentication context.

When transaction 104 is not permitted transaction 163 under current authentication context 134, authentication system 102 may determine step-up authentication scheme 162. Step-up authentication scheme 162 is one of available authentication schemes 154. Step-up authentication scheme 162 authenticates identity 106 of user 108 within step-up authentication context 164. Step-up authentication context 164 is one of authentication contexts 110 under which transaction 104 is permitted transaction 163. In other words, identity assurance levels 152 of step-up authentication context 164 adequately attest identity 106 of user 108 such that transaction 104 becomes permitted transaction 163 under step-up authentication context 164. Authentication system 102 then returns authentication prompt 166 to device 122. Authentication prompt 166 prompts for credentials 128 to authenticate identity 106 of user 108 according to step-up authentication scheme 162. Upon submission of credentials 128 for step-up authentication scheme 162, identity 106 of user 108 is authenticated within step-up authentication context 164. Step-up authentication context 164 then becomes current authentication context 134.

In one illustrative example, one or more technical solutions are present that overcome a technical problem with reliably authenticating a user attempting to access information from an untrusted system. As a result, one or more technical solutions may provide a technical effect of reliably authenticating identity 106 of user 108 in an authentication context that provides adequate one of identity assurance levels 152 when accessing information 112 using device 122.

As a result, authentication system 102 operates as a special purpose computer system in which components thereof enable user 108 to perform transaction 104 under current authentication context 134 in a manner that adaptively authenticates the identity 106 of user 108 to more reliably detect and prevent fraudulent access to information 112. For example, authentication system 102 uses a risk-based, multifactor authentication based on the application of one or more rules in risk policy 138 to context parameters 140 of transaction 104 to determine risk score 136 for transaction 104. In this manner, transaction 104 is enabled based on risk factors 142, risk levels 148, and identity assurance levels 152.

Thus, authentication system 102 transforms computer system 118 into a special purpose computer system as compared to currently available general computer systems that do not have authentication system 102. Currently used general purpose computer systems do not adaptively authenticate identity 106 of user 108 within different ones of authentication contexts 110 to more reliably detect and prevent fraudulent access to information 112. Further, currently used general purpose computer systems do not enable transaction 104 only if transaction 104 is permitted transaction 163. For example, authentication system 102 enables transaction 104 only when current authentication context 134 is associated with identity assurance levels 152 that adequately attest identity 106 of user 108 as defined by one or more rules in risk policy 138.

Figure 2A:
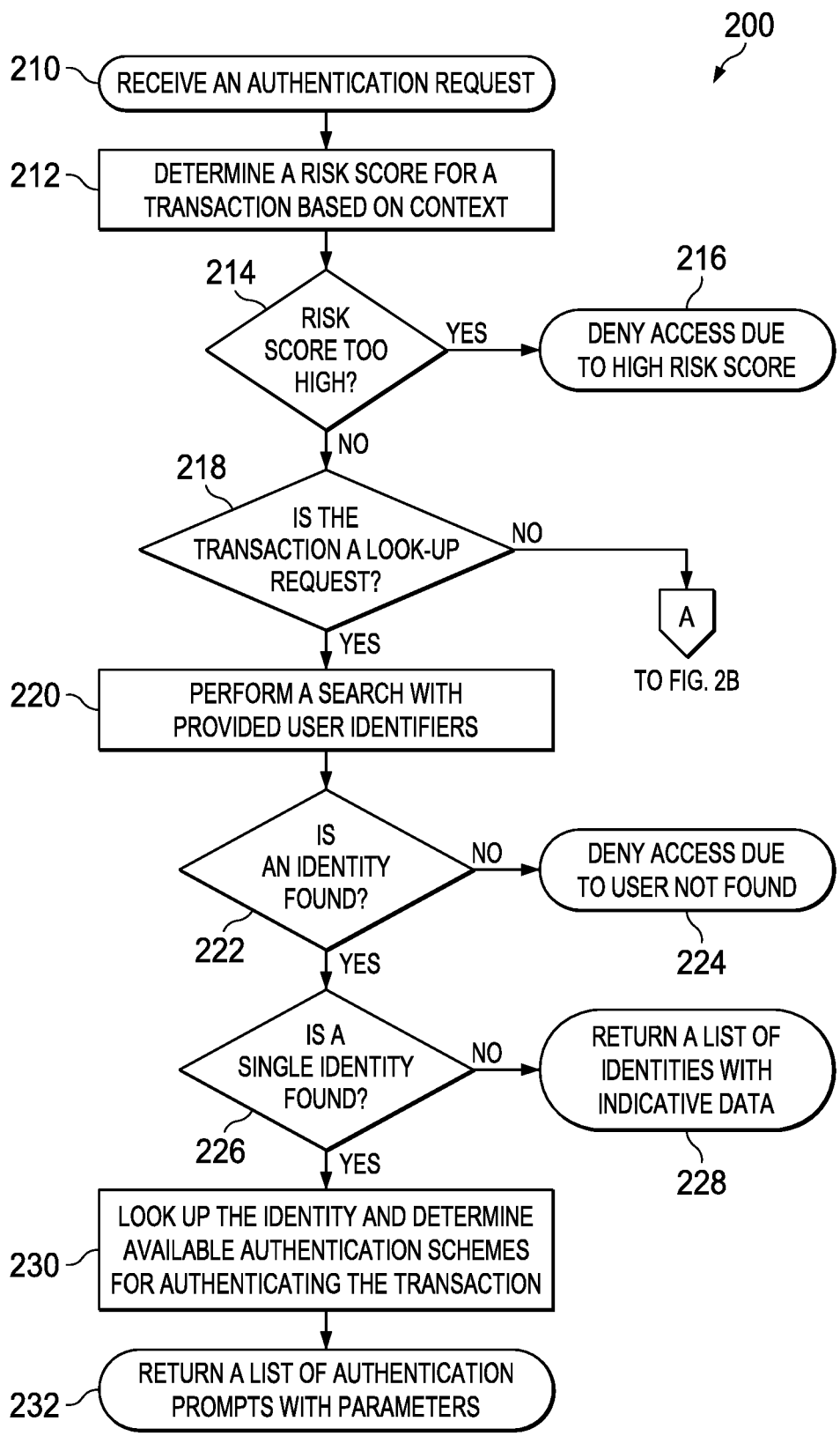
FIGS. 2A and 2B are illustrations of a flowchart of a method for authenticating a user transaction depicted in accordance with an illustrative embodiment.
Figure 2B:
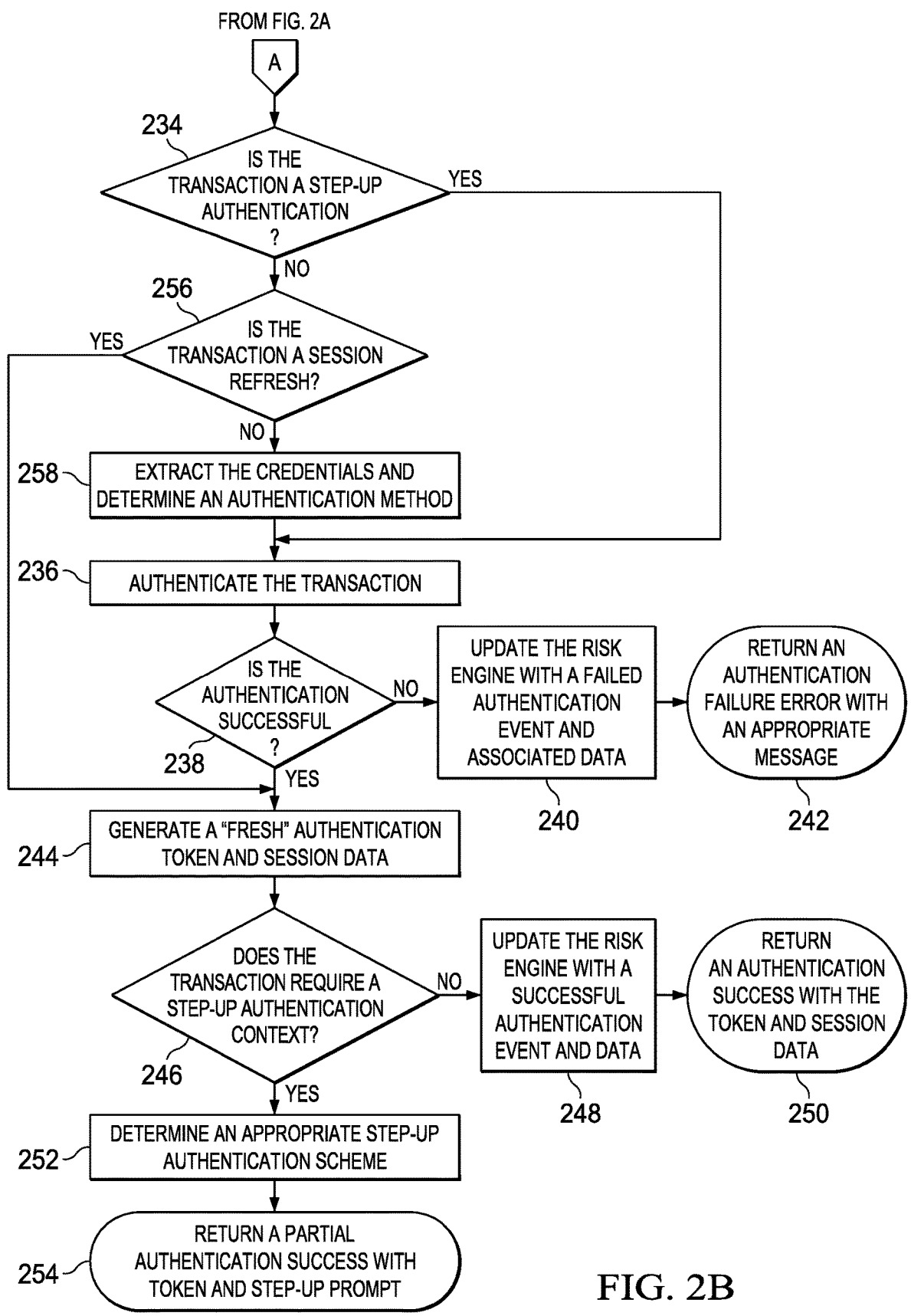

With reference next to FIGS. 2A and 2B, illustrations of a flowchart of a method for authenticating a user transaction are depicted in accordance with an illustrative embodiment. The process in FIGS. 2A and 2B may be implemented in authentication system 102 shown in block form in FIG. 1.

Process 200 begins by receiving an authentication request (step 210). The authentication request is an example of transaction 104, shown in block form in FIG. 1.

In response to receiving the authentication request, process 200 determines a risk score for a transaction (step 212). The risk score is an example of risk score 136, shown in block form in FIG. 1. The risk score can be determined by applying one or more rules they risk policy to context parameters of the transaction within a current authentication context, such as risk policy 138, context parameters 140 and current authentication context 134 respectively, all shown in block form in FIG. 1.

Process 200 then determines whether the risk score of the transaction is too high (step 214). Based on contextual risk factors of the transaction, such as contextual risk factors 144 shown in block form in FIG. 1, the likelihood of fraud for the transaction is very high. Under these conditions, the transaction is not a permitted transaction under any authentication context, such as permitted transaction 163 and authentication contexts 110, both shown in block form in FIG. 1. If the risk score is too high ("yes" at step 214), process 200 denies the transaction based on the high risk score (step 216), and the process terminates.

Returning now to step 214, if the risk score is not too high ("no" at step 214), process 200 performs different operations based on the determined transaction type, such as transaction types 150 shown in block form in FIG. 1. As depicted, process 200 determines whether the transaction is a look-up request (step 218). If the transaction is a look-up request ("yes" at step 218), process 200 performs a search of user profiles and accounts using provider user identifiers (step 220). User profiles, accounts, and identifiers can be user profile 133, accounts 130, and keyword 135, respectively, all shown in block form in FIG. 1.

A look-up request is one of transaction types 150 shown in block form in FIG. 1. The look-up request is typically associated with a very low risk level, such as one of risk levels 148 shown in block form in FIG. 1. Therefore, in one illustrative example, process 200 can perform step 220 regardless of a current authentication context, such as current authentication context 134 shown in block form in FIG. 1.

Process 200 determines whether an identity was found (step 222). The identity can be a user profile or an account, such as user profile 133 or one of accounts 130, both shown in block form in FIG. 1, that matches a keyword, an account, or a user profile indicated in the transaction. If an identity is not found ("no" at step 222), process 200 denies access based on the unidentified user (step 224), and the process terminates.

Returning now to step 222, if the identity is found ("yes" at step 222), and multiple identities are found that matches the keyword, the account, or the user profile indicated in the transaction ("no" at step 226), process 200 returns a list of the found identities, including indicative data (step 228), and the process terminates. The indicative data can be an identification of the accounts and the user profiles found by process 200, as well as data to differentiate between the accounts and the user profiles found.

Returning now to step 226, if a single identity is found that matches the keyword, the account, or the user profile indicated in the transaction ("yes" at step 226), process 200 looks up the found identity and determines available authentication schemes for authenticating the transaction (step 230). Process 200 then returns a list of authentication prompts with parameters (step 232), and process terminates. The authentication prompts can be, for example, authentication prompt 166 shown in block form in FIG. 1. The user can then initiate a subsequent transaction, including credentials to authenticate the identity of the user within a selected authentication scheme. The credentials and the authentication scheme may be credentials 128 can be authentication scheme 156 respectively, both shown in block form in FIG. 1.

Returning now to step 218, if the transaction is not a look-up request ("no" at step 218), process 200 determines whether the transaction is a step-up authentication (step 234). If the transaction is a step-up authentication ("yes" at step 234), process 200 authenticates the transaction (step 236). In this illustrative example, process 200 authenticates the transaction using a step-up authentication scheme, such as step-up authentication scheme 162 shown in block form in FIG. 1. If the authentication is not successful ("no" at step 238), process 200 updates the risk engine with a failed authentication event and associated data (step 240). Process 200 then returns an authentication failure error with an appropriate message (step 242), and the process terminates.

Returning now to step 238, if the authentication is successful ("yes" at step 238), process 200 generates a "fresh" authentication token and session data (step 244). The authentication token can be token 160, shown in block form in FIG. 1. The authentication token may be any security token or cookie that attests the identity of the user within the current authentication context.

Process 200 then determines whether the transaction requires a step-up authentication context (step 246). The step-up authentication context, such as step-up authentication context 164 shown in block form in FIG. 1, may be required if the transaction is not a permitted transaction, such as permitted transaction 163 shown in block form in FIG. 1, under a current authentication context. If the transaction does not require the step-up authentication context ("no" at step 246), process 200 updates the risk engine with a successful authentication event and data (step 248). The authentication event and data may be stored as part of access patterns 146 of user profile 133, both shown in block form in FIG. 1. Process 200 then returns an authentication success message with the generated token and session data (step 250), and the process terminates.

Returning now to step 246, if the transaction requires a step-up authentication context ("yes" at step 246), process 200 determines an appropriate step-up authentication scheme (step 252). The step-up authentication context can be step-up authentication context 164, shown in block form in FIG. 1, under which the transaction is a permitted transaction. In other words, an identity assurance level of the step-up authentication context, such as identity assurance levels 152 shown in block form of FIG. 1, adequately attests the identity of the user such that the transaction becomes the permitted transaction under the step-up authentication context. Process 200 returns a partial authentication success, including the generated token and an authentication prompt (step 254), such as authentication prompt 166 shown in block form in FIG. 1, and the process terminates. The authentication prompt is a prompt for credentials to authenticate identity 106 of user 108 according to the step-up authentication scheme 162. The user can then initiate a subsequent transaction, including the credentials to authenticate the identity of the user within the step-up authentication scheme. The credentials and authentication scheme may be credentials 128 and step up authentication scheme 162 respectively, both shown in block form in FIG. 1.

Returning now to step 234, if the transaction is not a step-up authentication ("no" at step 234), process 200 determines whether the transaction is a session refresh (step 256). If the transaction is a session refresh ("yes" at step 256), process 200 proceeds to step 244 and generates the "fresh" authentication token and session data.

Returning now to step 256, if the transaction is not a session refresh ("no" at step 256), the transaction is a new session. Process 200 extracts the credentials and determines an authentication method (step 258). The credentials can be credentials 128, shown in block form in FIG. 1, for authenticating the transaction under an authentication context, such as one of authentication contexts 110 shown in block form in FIG. 1. The authentication method is one of available authentication schemes 154, shown in block form in FIG. 1. Thereafter, process 200 proceeds to step 236 and authenticates the transaction under a current authentication context.

Figure 3:
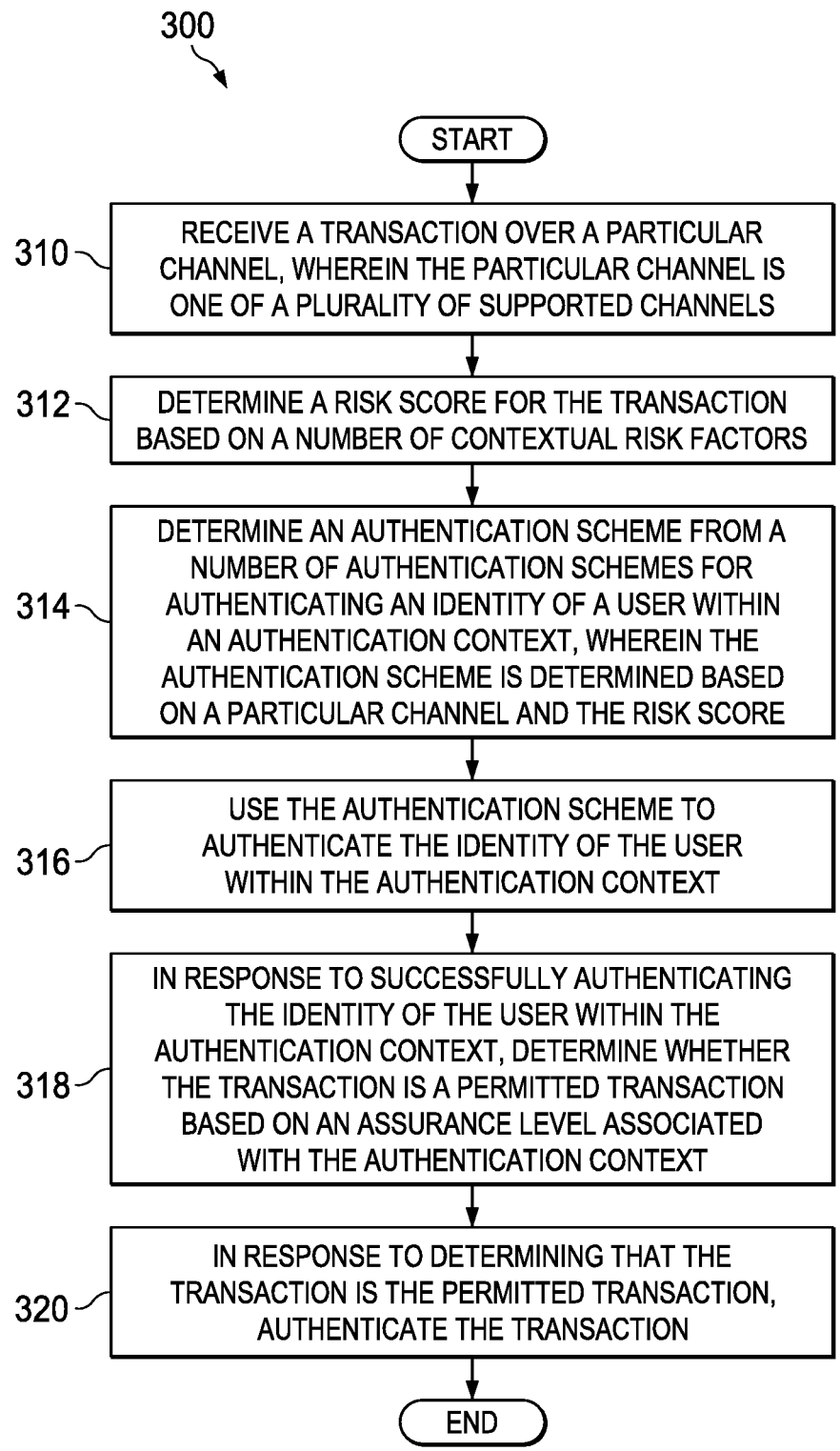
FIG. 3 is an illustration of a simplified flowchart of a method for authenticating a user transaction depicted in accordance with an illustrative embodiment.

With reference next to FIG. 3, an illustration of a simplified flowchart of a method for authenticating a user transaction is depicted in accordance with an illustrative embodiment. The process in FIG. 3 may be implemented in authentication system 102 shown in block form in FIG. 1. Process 300 is a simplified flowchart of process 200 of FIGS. 2A and 2B for authenticating a transaction of a user.

Process 300 begins by receiving a transaction over a particular channel (step 310). The particular channel is a channel used by a device to submit the transaction, such as channel 124 and transaction 104 respectively, both shown in block form in FIG. 1. The plurality of supported channels can be, for example, supported channels 155 shown in block form in FIG. 1. Step 310 is an example of step 210 of process 200 shown in FIG. 2A.

Process 300 determines a risk score for the transaction based on a number of contextual risk factors (step 312). The risk score and the contextual risk factors can be risk score 136 and contextual risk factors 144 respectively, shown in block form in FIG. 1. Process 300 can determine the risk score by applying one or more rules in a risk policy, such as risk policy 138 shown in block form in FIG. 1. Step 312 is an example of step 212 of process 200 shown in FIG. 2A.

Process 300 then determines an authentication scheme from a number of authentication schemes for authenticating an identity of a user within an authentication context (step 314). The authentication scheme is determined based on a particular channel and the risk score. Step 314 is an example of step 230 of process 200 shown in FIG. 2A.

Process 300 uses the authentication scheme to authenticate the identity of the user within the authentication context (step 316). Step 316 is an example of step 236 of process 200 shown in FIG. 2B.

In response to successfully authenticating the identity of the user within the authentication context, process 300 determines whether the transaction is a permitted transaction based on an assurance level associated with the authentication context (step 318). The permitted transaction and the assurance level can be, for example, permitted transaction 163 and identity assurance levels 152 respectively, both shown in block form in FIG. 1. The permitted transaction corresponds to a transaction type, such as one of transaction types 150 shown in block form in FIG. 1, which is allowed based on the identity assurance level of the current authentication context. Step 318 is an example of step 246 of process 200 shown in FIG. 2B.

In response to determining that the transaction is the permitted transaction, process 300 authenticates the transaction (step 320), with the process terminating thereafter. Step 320 is an example of step 250 of process 200 shown in FIG. 2B.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 4:
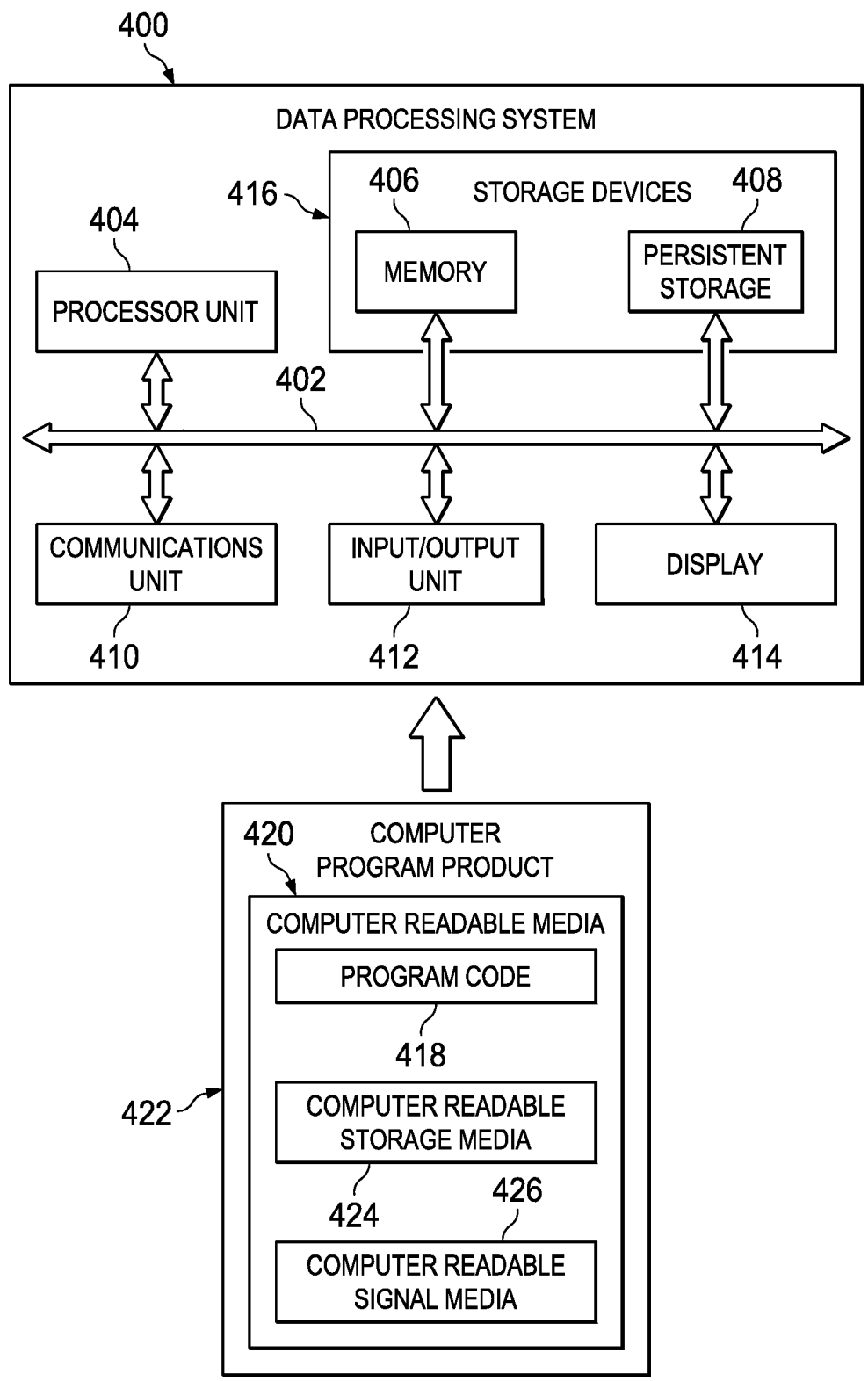
FIG. 4 is an illustration of a block diagram of a data processing system depicted in accordance with an illustrative embodiment.

Turning now to FIG. 4, an illustration of a block diagram of a data processing system is depicted in accordance with an illustrative embodiment. Data processing system 400 may be used to implement one or more of authentication system 102, computer system 118, device 122, or webserver 116 in FIG. 1. In this illustrative example, data processing system 400 includes communications framework 402, which provides communications between processor unit 404, memory 406, persistent storage 408, communications unit 410, input/output (I/O) unit 412, and display 414. In this example, communications framework 402 may take the form of a bus system.

Processor unit 404 serves to execute instructions for software that may be loaded into memory 406. Processor unit 404 may be a number of processors, a multi-processor core, or some other type of processor, depending on the particular implementation.

Memory 406 and persistent storage 408 are examples of storage devices 416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 416 may also be referred to as computer readable storage devices in these illustrative examples. Memory 406, in these examples, may be, for example, a random-access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a solid state hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these illustrative examples, provides for communications with other data processing systems or devices. In these illustrative examples, communications unit 410 is a network interface card.

Input/output unit 412 allows for input and output of data with other devices that may be connected to data processing system 400. For example, input/output unit 412 may provide a connection for user input through at least one of a keyboard, a mouse, or some other suitable input device. Further, input/output unit 412 may send output to a printer. Display 414 provides a mechanism to display information to a user.

Instructions for at least one of the operating system, applications, or programs may be located in storage devices 416, which are in communication with processor unit 404 through communications framework 402. The processes of the different embodiments may be performed by processor unit 404 using computer-implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these illustrative examples. In one example, computer readable media 420 may be computer readable storage media 424 or computer readable signal media 426.

In these illustrative examples, computer readable storage media 424 is a physical or tangible storage device used to store program code 418 rather than a medium that propagates or transmits program code 418.

Alternatively, program code 418 may be transferred to data processing system 400 using computer readable signal media 426. Computer readable signal media 426 may be, for example, a propagated data signal containing program code 418. For example, computer readable signal media 426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code 418.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, comprising:
   authenticating transactions of a user across multiple interaction channels using an authentication service executing on a computer system, the authentication service:
   receiving a first transaction over a first interaction channel, wherein the first interaction channel is one of the multiple interaction channels;
   determining a numeric risk score for the first transaction based on a number of contextual risk factors;
   determining a first authentication scheme from a number of authentication schemes for authenticating an identity of the user within a first authentication context, wherein the first authentication scheme is determined based on the first interaction channel and the numeric risk score;
   using the first authentication scheme to authenticate the identity of the user within the first authentication context;
   in response to successfully authenticating the identity of the user within the first authentication context, determining whether the first transaction is a permitted transaction based on an assurance level associated with the first authentication context;
   in response to determining that the first transaction is the permitted transaction, authenticating the first transaction;
   receiving a second transaction over a second interaction channel, wherein:
   the second interaction channel is one of the multiple interaction channels; and
   the second interaction channel is different than the first interaction channels; and
   using a second authentication scheme to authenticate the user within a second authentication context different than the first authentication context, wherein the second authentication scheme is a same authentication scheme as the first authentication scheme.

2. The method of claim 1, wherein the multiple interaction channels include a web-based authentication channel, a mobile authentication channel, a biometric authentication channel, a voice channel, and a risk-based authentication channel.

3. The method of claim 1, wherein the same authentication context is selected from an identity management context, an organizational context, and a social context.

4. The method of claim 1, wherein authenticating the transactions further includes the authentication service:
   identifying the number of contextual risk factors based on context parameters of the first transaction; and
   wherein the context parameters include a transaction type, and at least one of a current authentication context, a time of day that the first transaction is received, a geographic location from which the first transaction is received, a device type used by the user to submit the first transaction, prior access behavioral patterns of the user, a keyword, and a quality of network.

5. The method of claim 4, wherein the transaction type is selected from a lookup transaction, the transaction for authenticating the user, and managing privileges of an account of the user.

6. The method of claim 4, wherein the first transaction is a lookup transaction, and further comprising the authentication service:
   identifying a number of accounts based on information and the context parameters of the first transaction;
   returning an authentication prompt for information to disambiguate a user account from the number of accounts; and
   using the same authentication scheme to authenticate the identity of the user within the first authentication context, wherein the first authentication context is associated with the user account.

7. The method of claim 6, wherein the number of accounts comprises the user account, a second account of the user, an account of a different user, and combinations thereof.

8. The method of claim 4, wherein determining the first authentication scheme further comprises:
   determining the first authentication scheme from the number of authentication schemes based on the first interaction channel, the numeric risk score, and a policy associated with a user profile.

9. The method of claim 8, wherein the policy is based on one or more of a user preference, a risk level, and an organizational preference.

10. The method of claim 8, further comprising the authentication service:
    receiving the first transaction over the first interaction channel, wherein the first transaction includes the keyword that is associated with the user, wherein the keyword comprises one or more of a username, an email address, a name of an employer, a client identifier, or a company registration code;
    determining the user profile for the user based on the keyword; and
    returning an authentication prompt for credentials to authenticate the user according to the same authentication scheme.

11. The method of claim 1, wherein authenticating the transactions further includes the authentication service:
    generating a token in response to successfully authenticating the identity of the user within the first authentication context;
    sending the token to a user device; and
    storing the token on the user device, wherein the second transaction, is authenticated using the stored token with the second authentication context.

12. The method of claim 1, wherein authenticating the transactions further includes the authentication service:
    in response to determining that the first transaction is not the permitted transaction based on an identity assurance level of the first authentication context, determining a step-up authentication scheme for authenticating the identity of the user within a step-up authentication context, wherein the first transaction is the permitted transaction based on an identity assurance level associated with the step-up authentication context; and returning an authentication prompt for credentials to authenticate the identity of the user according to the step-up authentication scheme.

13. A computer system comprising:

a hardware processor; and an authentication system in communication with the hardware processor, the authentication system consistently authenticating a user across multiple interaction channels by:

a first authentication for a first interaction channel for the user performed by:

receiving a first transaction over the first interaction channel, wherein the first interaction channel is one of the multiple interaction channels;

determining a risk score for the first transaction based on a number of contextual risk factors;

determining an authentication scheme from a number of authentication schemes for authenticating an identity of the user within a first authentication context, wherein the authentication scheme is determined based on the first interaction channel and the risk score;

using the authentication scheme to authenticate the identity of the user within the first authentication context;

in response to successfully authenticating the identity of the user within the first authentication context, determining whether the first transaction is a permitted transaction based on an assurance level associated with the first authentication context, wherein the assurance level is a classification of a certainty of identity that is selected based on the first authentication context; and in response to determining that the first transaction is the permitted transaction, authenticating the first transaction; and a second authentication for a second interaction channel for the user performed by:

receiving a second transaction over the second interaction channel, wherein:

the second interaction channel is one of the multiple interaction channels; and the second interaction channel is different than the first interaction channel; and using the authentication scheme to authenticate the identity of the user within a second authentication context different than the first authentication context.

14. The computer system of claim 13, wherein the multiple interaction channels include a web-based authentication channel, a mobile authentication channel, a biometric authentication channel, a voice channel, and a risk-based authentication channel.

15. The computer system of claim 13, wherein the first authentication context is selected from an identity management context, an organizational context, and a social context.

16. The computer system of claim 13, wherein the first authentication further includes:

identifying the number of contextual risk factors based on context parameters of the first transaction; and wherein the context parameters include a transaction type and at least one of a current authentication context, a time of day that the first transaction is received, a geographic location from which the first transaction is received, a device type used by the user to submit the first transaction, prior access behavioral patterns of the user, a keyword, and a quality of network.

17. The computer system of claim 16, wherein the transaction type is selected from a lookup transaction, authenticating the identity of the user, managing privileges of an account of the user.

18. The computer system of claim 16, wherein the first transaction is a lookup transaction, and wherein the first authentication further includes:

identifying a number of accounts based on information and the context parameters of the first transaction;

returning an authentication prompt for information to disambiguate a user account from the number of accounts; and using the authentication scheme to authenticate the identity of the user within the first authentication context, wherein the first authentication context is associated with the user account.

19. The computer system of claim 18, wherein the number of accounts comprises the user account, a second account of the user, an account of a different user, and combinations thereof.

20. The computer system of claim 16, wherein in determining the authentication scheme, the first authentication further includes:

determining the authentication scheme from the number of authentication schemes based on the first interaction channel, the risk score, and a policy associated with a user profile.

21. The computer system of claim 20, wherein the policy is based on one or more of a user preference, a risk level, and an organizational preference.

22. The computer system of claim 20, wherein the first authentication further includes:

receiving the first transaction over the first interaction channel, wherein the first transaction includes the keyword that is associated with the user, wherein the keyword comprises one or more of a username, an email address, a name of an employer, a client identifier, or a company registration code;

determining the user profile for the user based on the keyword; and returning an authentication prompt for credentials to authenticate the identity of the user according to the authentication scheme.

23. The computer system of claim 13, wherein:

the first authentication generates a token in response to successfully authenticating the identity of the user within the first authentication context;

the token is sent from the authentication system to a user device;

the token is stored on the user device; and the second transaction is authenticated using the token with the second authentication context.

24. The computer system of claim 13, wherein the first authentication further includes:

in response to determining that the first transaction is not the permitted transaction based on an identity assurance level of the first authentication context:

determining a step-up authentication scheme for authenticating the identity of the user within a step-up authentication context, wherein the first transaction is the permitted transaction based on an identity assurance level associated with the step-up authentication context; and returning an authentication prompt for credentials to authenticate the identity of the user according to the step-up authentication scheme.

25. A computer program product comprising:
a computer readable storage medium having instructions stored thereon for reliably authenticating a user across multiple interaction channels, the instructions comprising:
first program code for receiving a first transaction over a first interaction channel, wherein the first interaction channel is one of the multiple interaction channels;
second program code for determining a risk score for the first transaction based on a number of contextual risk factors, wherein the risk score is a numeric score within a predefined range;
third program code for determining a first authentication scheme from a number of authentication schemes for authenticating an identity of the user within a first authentication context, wherein the first authentication scheme is determined based on the first interaction channel and the risk score;
fourth program code for using the first authentication scheme to authenticate the identity of the user within the first authentication context;
fifth program code for determining, in response to successfully authenticating the identity of the user within the first authentication context, whether the first transaction is a permitted transaction based on an assurance level associated with the first authentication context;
sixth program code for authenticating the first transaction in response to determining that the first transaction is the permitted transaction;
seventh program code for receiving a second transaction over a second interaction channel, wherein:
the second interaction channel is one of the multiple interaction channels; and
the second interaction channel is different than the first interaction channel; and
eighth program code for using a second authentication scheme to authenticate the user within a second authentication context different than the first authentication context, wherein the second authentication scheme is a same authentication scheme as the first authentication scheme.

26. The computer program product of claim 25, wherein the multiple interaction channels includes a web-based authentication channel, a mobile authentication channel, a biometric authentication channel, a voice channel, and a risk-based authentication channel.

27. The computer program product of claim 25, wherein the first authentication context is selected from an identity management context, an organizational context, and a social context.

28. The computer program product of claim 25, wherein the instructions further comprise:
ninth program code for identifying the number of contextual risk factors based on context parameters of the first transaction; and
wherein the context parameters include a transaction type, and at least one of a current authentication context, a time of day that the first transaction is received, a geographic location from which the first transaction is received, a device type used by the user to submit the first transaction, prior access behavioral patterns of the user, keyword, and a quality of network.

29. The computer program product of claim 28, wherein the transaction type is selected from a lookup transaction, authenticating the user and managing privileges of an account of the user.

30. The computer program product of claim 28, wherein the first transaction is a lookup transaction, and the instructions further comprise:
tenth program code for identifying a number of accounts based on information and the context parameters of the first transaction;
eleventh program code for returning an authentication prompt, for information to disambiguate a user account from the number of accounts; and
twelfth program code for using the first authentication scheme to authenticate the identity of the user within the first authentication context, wherein the first authentication context is associated with the user account.

31. The computer program product of claim 30, wherein the number of accounts comprises the user account, a second account of the user, an account of a different user, and combinations thereof.

32. The computer program product of claim 28, wherein the third program code further comprises:
tenth program code for determining the first authentication scheme from the number of authentication schemes based on the first interaction channel, the risk score, and a policy associated with a user profile.

33. The computer program product of claim 32, wherein the policy is based on one or more of a user preference, a risk level, or an organizational preference.

34. The computer program product of claim 32, wherein the instructions further comprise:
eleventh program code for receiving the first transaction over the first interaction channel, wherein the first transaction includes a keyword that is associated with the user, and the keyword comprises one or more of a username, an email address, a name of an employer, a client identifier, or a company registration code;
twelfth program code for determining the user profile for the user based on the keyword; and
thirteenth program code for returning an authentication prompt for credentials to authenticate the user according to the first authentication scheme.

35. The computer program product of claim 25, wherein the instructions further comprise:
ninth program code for generating a token in response to successfully authenticating the identity of the user within the first authentication context;
tenth program code for sending the token from an authentication system to a user device, wherein the token is stored on the user device; and
eleventh program code for receiving a second transaction and using the token with the second authentication scheme to authenticate the user within the second authentication context.

36. The computer program product of claim 25, wherein the instructions further comprise:
ninth program code for determining, in response to determining that the first transaction is not the permitted transaction based on an identity assurance level of the first authentication context, a step-up authentication scheme for authenticating the identity of the user within a step-up authentication context, wherein the first transaction is the permitted transaction based on an identity assurance level associated with the step-up authentication context; and tenth program code for returning an authentication prompt for credentials to authenticate the identity of the user according to the step-up authentication scheme.

* * * * *